United States Patent
Dyatlov et al.

(10) Patent No.: US 9,341,739 B2
(45) Date of Patent: May 17, 2016

(54) APPARATUS AND METHOD FOR ESTIMATING GEOLOGIC BOUNDARIES

(75) Inventors: Gleb Dyatlov, Novosibirsk (RU); Sophia Ilyina, Novosibirsk (RU); Dashevsky Yuliy Aleksandrovich, Novosibirsk (RU)

(73) Assignee: BAKER HUGHES INCORPORATED, Houston, TX (US)

( * ) Notice: Subject to any disclaimer, the term of this patent is extended or adjusted under 35 U.S.C. 154(b) by 1107 days.

(21) Appl. No.: 13/414,070

(22) Filed: Mar. 7, 2012

(65) Prior Publication Data

US 2013/0066560 A1 Mar. 14, 2013

(30) Foreign Application Priority Data

Sep. 7, 2011 (RU) .................. PCT/RU2011/000684

(51) Int. Cl.
*G01V 1/28* (2006.01)
*G01V 7/06* (2006.01)

(52) U.S. Cl.
CPC ....................... *G01V 7/06* (2013.01)

(58) Field of Classification Search
CPC .................... G01V 7/06; E21B 7/09
See application file for complete search history.

(56) References Cited

U.S. PATENT DOCUMENTS

| 3,747,403 A | 7/1973 | Yungul |
| 4,596,139 A | 6/1986 | Gournay |

(Continued)

FOREIGN PATENT DOCUMENTS

MX 256158 B 4/2008

OTHER PUBLICATIONS

H. O. Seigel, C. Nind, J. MacQueen, M. Chouteau, and B. Giroux Results from the first field trial of a borehole gravity meter for mining applications, Presentation at the ASEG•s 20th International Geophysical Conference, held at Adelaide in Feb. 2009. 1 page.

(Continued)

*Primary Examiner* — Elias Desta
(74) *Attorney, Agent, or Firm* — Cantor Colburn LLP

(57) ABSTRACT

A method of estimating a geology of an earth formation includes: receiving gravity measurements from each of a plurality of gravity sensors $n^s_j$ arrayed along a length of a borehole in an earth formation, each of the sensors $n^s_j$ generating a gravity measurement $g_j$ associated with a location $z^s_j$, each of the plurality of sensors separated by a distance h; generating a model of the earth formation that includes approximate geological boundaries $N_m$ having an approximate depth $z^m_k$, the geological boundaries defining a number of geologic layers therebetween; assuming that each geological boundary is represented by a minimum density change and each of the geologic layers has a thickness that encompasses two or more of the plurality of sensors $n^s_j$; and estimating a location and a density change $\Delta\rho$ of a geologic boundary z between locations $z^s_j$ and $z^s_{j+1}$ based on the gravity measurements $g_j$ and the distance h.

20 Claims, 10 Drawing Sheets

(56) References Cited

U.S. PATENT DOCUMENTS

| | | | |
|---|---|---|---|
| 4,625,547 | A | 12/1986 | Lyle, Jr. |
| 5,218,864 | A * | 6/1993 | Pennybaker ............... 73/152.05 |
| 5,821,413 | A | 10/1998 | Chapin |
| 5,970,787 | A | 10/1999 | Wignall |
| 6,014,343 | A * | 1/2000 | Graf et al. ...................... 367/38 |
| 6,502,037 | B1 | 12/2002 | Jorgensen et al. |
| 7,069,780 | B2 | 7/2006 | Ander |
| 7,149,672 | B2 | 12/2006 | Torkildsen |
| 8,072,841 | B2 * | 12/2011 | Chang et al. ..................... 367/73 |
| 2008/0295594 | A1 | 12/2008 | Aliod et al. |
| 2010/0286967 | A1 | 11/2010 | Vasilevskiy et al. |
| 2011/0042073 | A1 | 2/2011 | Legendre et al. |

OTHER PUBLICATIONS

Notification of Transmittal of the International Search Report and the Written Opinion of the International Searching Authority, or the Declaration; PCT/RU2011/000684; Jul. 19, 2012. 13 pages.

J. D. MacQueen and E. Mann "Borehole Gravity Meter Surveys at the Waste Treatment Plant, Hanford, Washington", Mar. 2007. Prepared by Microg-LaCoste for the Pacific Northwest National Laboratory under Contract DEAC05-76RL01830 with the U.S. Department of Energy, 177 pages.

Smith, "The Case for Gravity Data From Boreholes". Geophysics USA, vol. 15 Oct. 1950, pp. 605-636.

Jones, "The Use of Downhole Gravity Data in Fromation Evaluation". SPWLA Thirteenth Annual Logging Symposium, May 7-10, 1972. pp. 1-13.

LaFehr, "Rock Density form borehole gravity surveys". Geophysics, vol. 48, No. 3 (Mar. 1983); P, 341-356, 16 Figs.

Loermans, et al. "Intelligent Monitoring? . . . Add Borehole Gravity Measurements!". SPE 99554. SPE Intelligent Energy Conference and Exhibition held in Amsterdam, The Netherlands, Apr. 11-13, 2006. 6 pages.

* cited by examiner

APPARATUS AND METHOD FOR ESTIMATING GEOLOGIC BOUNDARIES

CROSS-REFERENCE TO RELATED APPLICATIONS AND PRIORITY CLAIM

This application claims the benefit of PCT Application No. PCT/RU2011/000684, entitled "APPARATUS AND METHOD FOR ESTIMATING GEOLOGIC BOUNDARIES", filed Sep. 7, 2011, which is incorporated herein by reference in its entirety.

BACKGROUND

During hydrocarbon drilling and recovery operations, and in an effort to identify petroleum sources underground, various properties of earth formations are measured by lowering measurement tools into a drilled borehole. For example, field of gravity measurements are taken in boreholes to estimate properties such as formation density. From a geophysical point of view, a high level of precision and repeatability of borehole measurements determine the success of monitoring earth formations.

One of the applications of borehole gravity measurements in formation evaluation includes estimating bulk density and determining porosity and fluid saturation. Borehole gravity meters are able to sense through casing and far away from a borehole. However, such meters require sophisticated techniques (accurate sensors, exact location of the tool, etc.) As a result, tool position and/or depth error occurs due to, e.g., movement of the tool producing variations in depth over repeated measurements. Additional challenges arise in relation to inversion of borehole gravity data. Traditional inversion methods produce the so-called apparent density, which may differ significantly from the true bulk density, especially when the acquired data is contaminated with noise.

SUMMARY

A method of estimating a geology of an earth formation includes: receiving gravity measurements from each of a plurality of gravity sensors $n^s_j$ arrayed along a length of a borehole in an earth formation, each of the plurality of sensors $n^s_j$ generating a gravity measurement $g_j$ associated with a location $z^s_j$, each of the plurality of sensors separated by a distance h; generating a model of the earth formation that includes approximate geological boundaries $N_m$ having an approximate depth $z^m_k$, the geological boundaries defining a number of geologic layers therebetween; assuming that each geological boundary is represented by a minimum density change and each of the geologic layers has a thickness that encompasses two or more of the plurality of sensors $n^s_j$; and estimating a location and a density change $\Delta\rho$ of a geologic boundary z between locations $z^s_j$ and $z^s_{j+1}$ based on the gravity measurements $g_j$ and the distance h.

A computer program product comprising machine readable instructions stored on machine readable media, the instructions for estimating a property of an earth formation by implementing a method including: receiving gravity measurements from each of a plurality of gravity sensors $n^s_j$ arrayed along a length of a borehole in an earth formation, each of the plurality of sensors $n^s_j$ generating a gravity measurement $g_j$ associated with a location $z^s_j$, each of the plurality of sensors separated by a distance h; generating a model of the earth formation that includes approximate geological boundaries $N_m$ having an approximate depth $z^m_k$, the geological boundaries defining a number of geologic layers therebetween; assuming that each geological boundary is represented by a minimum density change and each of the geologic layers has a thickness that encompasses two or more of the plurality of sensors $n^s_j$; and estimating a location and a density change $\Delta\rho$ of a geologic boundary z between locations $z^s_j$ and $z^s_{j+1}$ based on the gravity measurements $g_j$ and the distance h.

BRIEF DESCRIPTION OF THE DRAWINGS

The following descriptions should not be considered limiting in any way. With reference to the accompanying drawings, like elements are numbered alike.

DETAILED DESCRIPTION

Described herein are systems and methods for estimating density parameters of an earth formation. A method includes analyzing gravity measurements from an array of borehole gravity sensors to estimate locations of geologic boundaries in the formation based on estimated locations of density changes or "jumps". In one embodiment, a method includes generating a model including one or more approximate boundaries. Various a priori assumptions may be made, such as assuming that a boundary's density jump is high and that the geologic layers are relatively thick relative to the distribution of sensors (e.g., at least three sensors per layer). The method allows for accurate estimation of boundaries that indicate geologic layers, as well as the ability to distinguish data peaks indicating geologic layers from peaks resulting from measurement errors.

Figure 1:
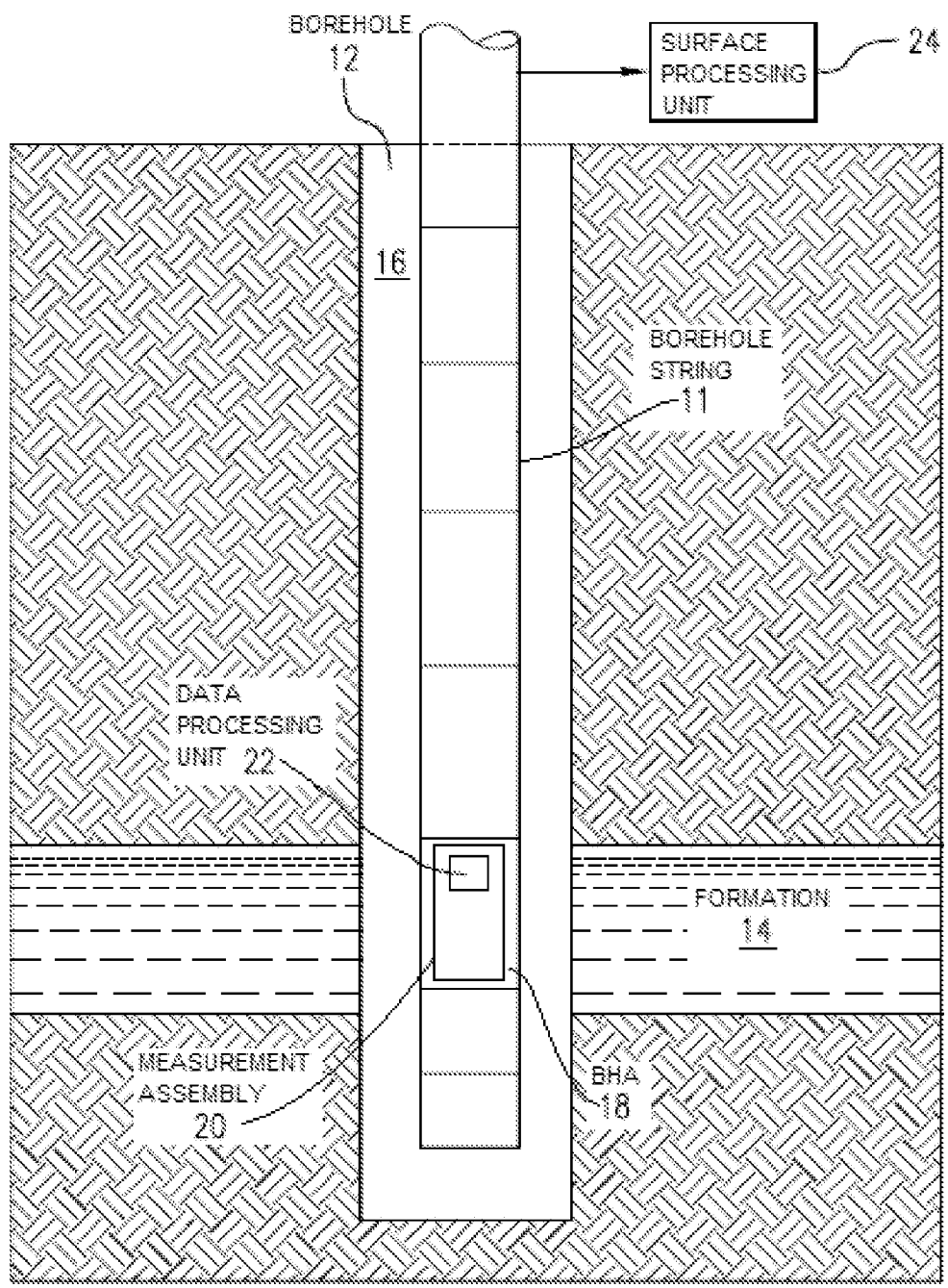
FIG. 1 depicts an embodiment of a well logging and/or drilling system.

Referring to FIG. 1, an exemplary embodiment of a well logging, production and/or drilling system 10 includes a borehole string 11 that is shown disposed in a borehole 12 that penetrates at least one earth formation 14 during a drilling, well logging and/or hydrocarbon production operation. In one embodiment, the string 11 includes a drill pipe, which may be one or more pipe sections or coiled tubing. In one embodiment, the system 10 also includes a bottomhole assembly (BHA) 18. A borehole fluid 16 such as a drilling or completion fluid or drilling mud may be pumped through the drillstring 11, the BHA 18 and/or the borehole 12.

The BHA 18, or other portion of the borehole string 11, includes a measurement assembly 20 configured to estimate at least one property of the formation 14 and/or the borehole 12. The assembly 20, in one embodiment, includes a data processing unit 22 for processing and/or presenting data related to the at least one property. In one embodiment, the data processing unit 22 and/or the measurement assembly 20 is incorporated into or is in communication with a surface processing unit 24. The BHA 18 and/or the measurement assembly 20 incorporates any of various transmission media and connections, such as wired connections, fiber optic connections, wireless connections and mud pulse telemetry.

In one embodiment, the data processing unit 22 and/or the surface processing unit 24 includes components as necessary to provide for storing and/or processing data collected from the assembly 20. Exemplary components include, without limitation, at least one processor, storage, memory, input devices, output devices and the like. In one embodiment, the data processing unit 22 and/or the surface processing unit 24 is configured as a control unit to control the operation of the measurement assembly and/or other components of the system 10.

Figure 2:
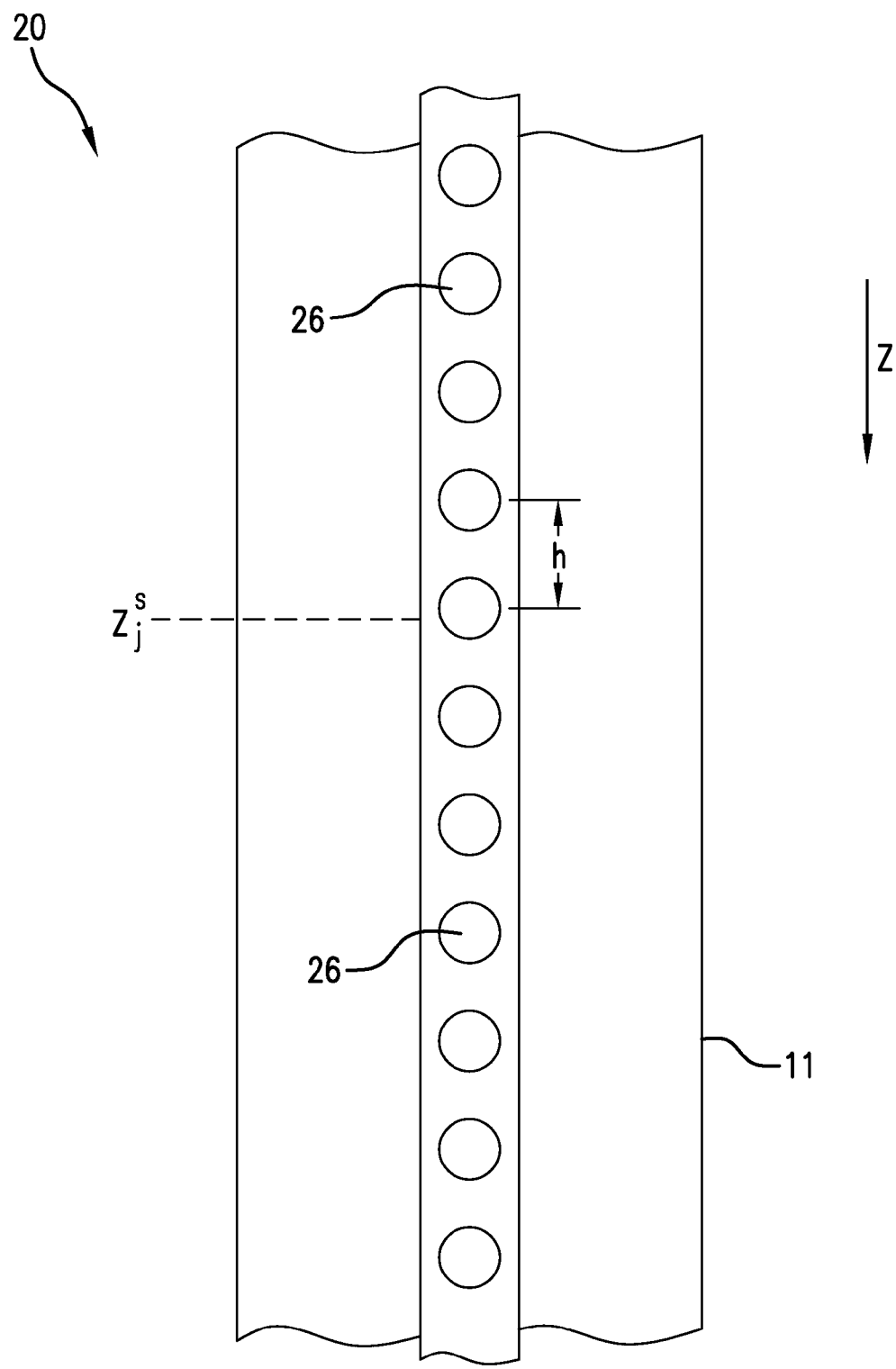
FIG. 2 depicts an exemplary measurement assembly of the system of FIG. 1 including an array of gravity sensors.

Referring to FIG. 2, the measurement assembly 20 includes a plurality of sensors 26, which are arrayed along a length of the string 11 and/or borehole 12, each of which is displaced or offset from one another by a fixed distance "h". In one embodiment, the sensors 26 are configured as gravimeters to measure the acceleration due to gravity, which is equal to the gradient of the gravitational potential energy. Gravimeters are often used for two-dimension mapping of the acceleration in gravitational surveys. Any suitable gravimeters may be used, including various spring-type gravimeters and superconducting gravimeters. Gravimeters may include absolute gravimeters and relative gravimeters that are used in conjunction with one or more reference gravimeters located remotely from each relative gravimeter.

In one embodiment, the measurement assembly 20 is configured as a borehole absolute gravity meter with multiple sensors (BHGMMS) arrayed along a length of the borehole 12, also referred to as a g-string or g-array. The g-array includes two or more absolute gravity sensors disposed at a fixed spacing h between each other.

Figure 3:
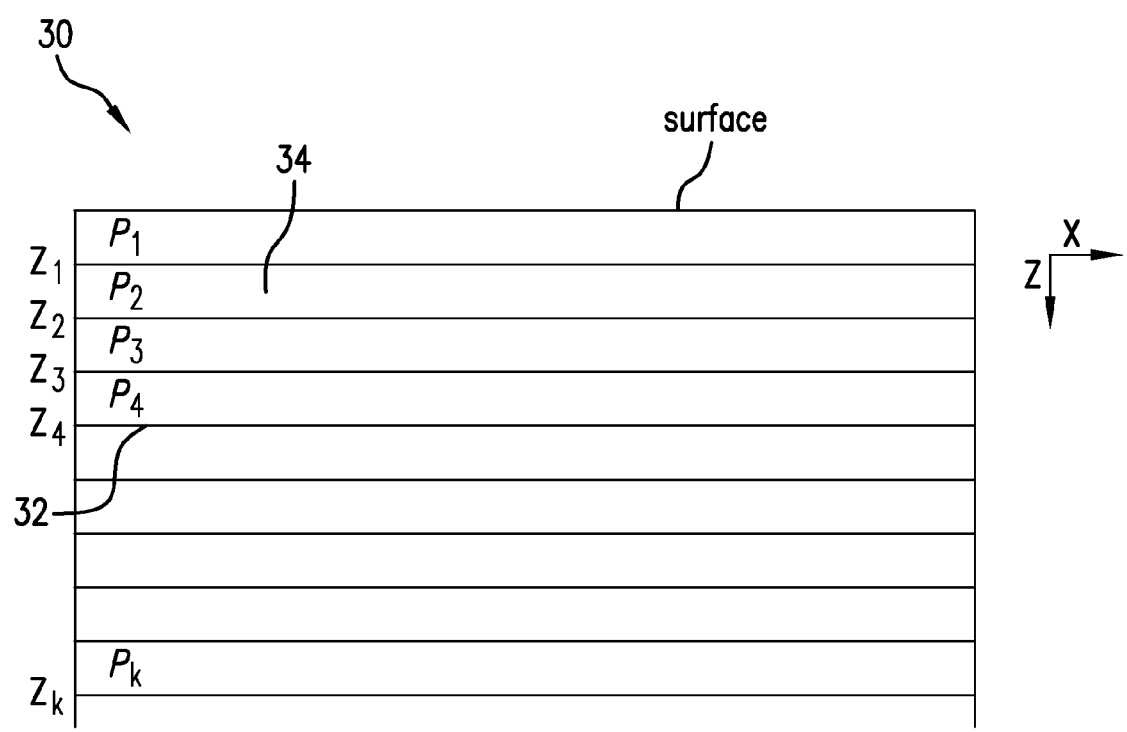
FIG. 3 is an exemplary model of an earth formation.

Data processing methods described herein may be used in conjunction with a formation model that may include various assumptions as well as preliminary or approximate locations of geologic layer boundaries. An exemplary model 30 described as a horizontally layered earth model is shown in FIG. 3. In this model, $z_k$, k=1, . . . , N, are the depths of model layer boundaries 32 defining modeled geologic layers 34 and $\rho_k$, k=1, . . . , N−1, are the layer densities; i.e., the density $\rho = \rho(z)$ is a piecewise constant function such that $\rho(z) = \rho_k$ for $z_k \leq z < z_{k+1}$. A geologic boundary may be defined as a depth at which the density $\rho$ jumps, i.e., increases or decreases by a selected amount over a selected depth range. One example of a boundary is a location at or between a pair of adjacent sensors, where the density measured jumps or changes by a selected amount.

The gravity field g(z) (more exactly its absolute value, which is also equal to the vertical component) is measured in this model in a vertical borehole using the arrayed gravity sensors 26 at the depths $z^s_j$, j=1, . . . , $N_s$, located uniformly with step $h = z^s_{k+1} - z^s_k$. Thus, the acquired data corresponding to gravity measurements by each sensor 26 can be represented by $g^\epsilon_j = g(z^s_j + \delta_j) + \xi_j$, where $\delta_j$ is the sensor location error (i.e., error in measurements of sensor position) and $\xi_j$ is the sensor measuring error (i.e., error in gravity measurements taken by sensors 26. In this model, effects connected with the size of the borehole are ignored.

Data processing is utilized to find the density $\rho = \rho(z)$ for z between the first and last sensor points, $z^s_1 \leq z \leq z^s_{N_s}$, from the borehole gravity data $\{z^s_j, g^\epsilon_j\}$, j=1, . . . , $N_s$. Locations or points described herein are described as depths of sensors 26 or sensor measurements. It is understood that depth is not necessarily true vertical depth or depth corresponding with a vertical borehole. In some embodiments, depth can be considered to be an axial location along a length of a borehole, which may be vertical and/or have lengths that form a path that deviates from the vertical.

The gravity field g(z) in the layered earth model 30 can be given by the formula:

$$g(z) = \sum_{k=1}^{N-1} g_k^{slab}(z) + Fz + C, \quad (1)$$

where:

$$g_k^{slab}(z) = \begin{cases} -2\pi G \rho_k (z_{k+1} - z_k), & z > z_{k+1}, \\ 2\pi G \rho_k (z_{k+1} - z_k), & z < z_k, \\ 2\pi G \rho_k \frac{z_{k+1} + z_k - 2z}{z_{k+1} - z_k}, & z_k < z < z_{k+1}, \end{cases} \quad (2)$$

is the gravity field of the slab or geologic volume (e.g., the geologic layer) between $z_k$ and $z_{k+1}$ at some point or depth z, and G is the universal gravitational constant. The linear function Fz+C is determined by the geographic position (longitude, latitude, and elevation) of the borehole and is known. The value F is called the normal gradient and varies by about 308.6 μGal/m.

Based on equation (2), it can be demonstrated that, at points $z \neq z_k$, k=1, . . . , N $$\rho(z) = -\frac{1}{4\pi G}(g'(z) - F), \quad (3)$$

where the symbol prime (') indicates a derivative. This means that if the gravity field were known at all points on the borehole axis with absolute accuracy, then the problem of finding $\rho(z)$ from g(z) would be trivial. However, the problem has a number of peculiarities that preclude such trivial solutions.

First, the field g(z) is measured at single points $z^s_j$ separated by a certain step or distance h, which can be comparable with or even greater than the layer thickness. Prior art measurement systems generally take measurements using a step h on the order of 30 feet or 10 meters, or as small as 10 feet or 3 meters.

Second, the acquisition points $z^s_j$ are in no way related to the layer boundaries $z_k$, which means that the above approach gives only the so-called apparent density (AD).

Third, measurements of the gravity field in a borehole include errors related to both the sensor measurements and sensor position, i.e., $g^\epsilon_j = g(z^s_j + \delta_j) + \xi_j$, where $\delta_j$ is the sensor location error and $\xi_j$ is the sensor error. Current gravity meters provide a sensor location accuracy of about 10 cm and a sensor measurement accuracy typically up to about 5 μGal. Also, the positioning error contributes to total measurement error, e.g., a positioning error of 10 cm has a contribution to the total measurement error of about 10 μGal. Thus, the positioning error can be accounted for in $\xi_j$ so that only one error constant is needed (i.e., let $\delta_j=0$). It can be assumed that the errors $\xi_j$ are independent and normally distributed with zero mean and deviation $\epsilon$.

These peculiarities imply that the problem of finding $\rho(z)$ from gravity field measurements $g^\epsilon_j$ does not have a unique solution in general. Indeed, if the density $\rho(z)$ between the points $z^s_j$ and $z^s_{j+1}$ is changed so that the integral $$\int_{z^s_j}^{z^s_{j+1}} \rho(z)dz$$

remains the same, then it will have no effect on the gravity data at all points.

Because the true locations of geological boundaries are not known, techniques for estimating such boundaries deal with model boundaries. Thus, estimating such boundaries includes finding an approximate solution to the inverse borehole gravity problem in the class of piecewise constant functions $\rho^m = \rho^m(z)$ of the form $\rho^m(z) = \rho_k^m$ for $z_k^m \le z < z_{k+1}^m$, where $z_k^m$, $k=1, \ldots, N_m$, ($N_m \ge N_s$, N) are the density jump points or the model boundaries.

There are typically two options in the prior art to find this approximate solution. The first assumes that the points $z_k^m$ as well as the densities $\rho_k^m$ may vary and poses the problem of finding the layer boundaries together with the densities. This approach leads to a nonlinear problem whose solution by means of optimization methods requires a good initial approximation.

The second prior art option is referred to as the apparent density (AD) method. This method includes choosing and fixing the model boundaries $z_k^m$, thereby narrowing the class in which the solution is sought, and then finding the appropriate values of $\rho_k^m$. Once the boundaries are fixed the problem is linear in $\rho_k^m$. Different choices of the model boundaries $z_k^m$ lead to different inversion methods. Traditionally, interpretation of the borehole gravity data is carried out using this second option with the model boundaries $z_k^m$ equal to the sensor points $z^s_j$. This leads to the well-known inversion formula:

$$\rho^m(z) = \rho_k^m = -\frac{1}{4\pi G}\left(\frac{g^\epsilon_{k+1} - g^\epsilon_k}{z^s_{k+1} - z^s_k} - F\right) \quad (4)$$

for $$z^s_k \le z < z^s_{k=1}.$$

The so-obtained density is called the apparent density, denoted by $\rho^{app}(z)$ In the ideal case when the sensors are at the true layer boundaries and the data are error-free, the apparent density $\rho^{app}(z)$ coincides with the true density $\rho(z)$. However, the apparent density may significantly differ from the true density but, at the same time, provide the perfect fit between field data and model gravity data calculated using the apparent density. Since the density is connected with the gravity field through differentiation, the inverse borehole gravity problem is ill-posed in the sense that small measurement data errors may lead to large density errors. This is already seen in finding the apparent density. Division of the increment of gravity data with large errors by a small h leads to large errors in density. Solution of ill-posed problems requires some regularization, i.e., usage of a priori information.

Figure 4:
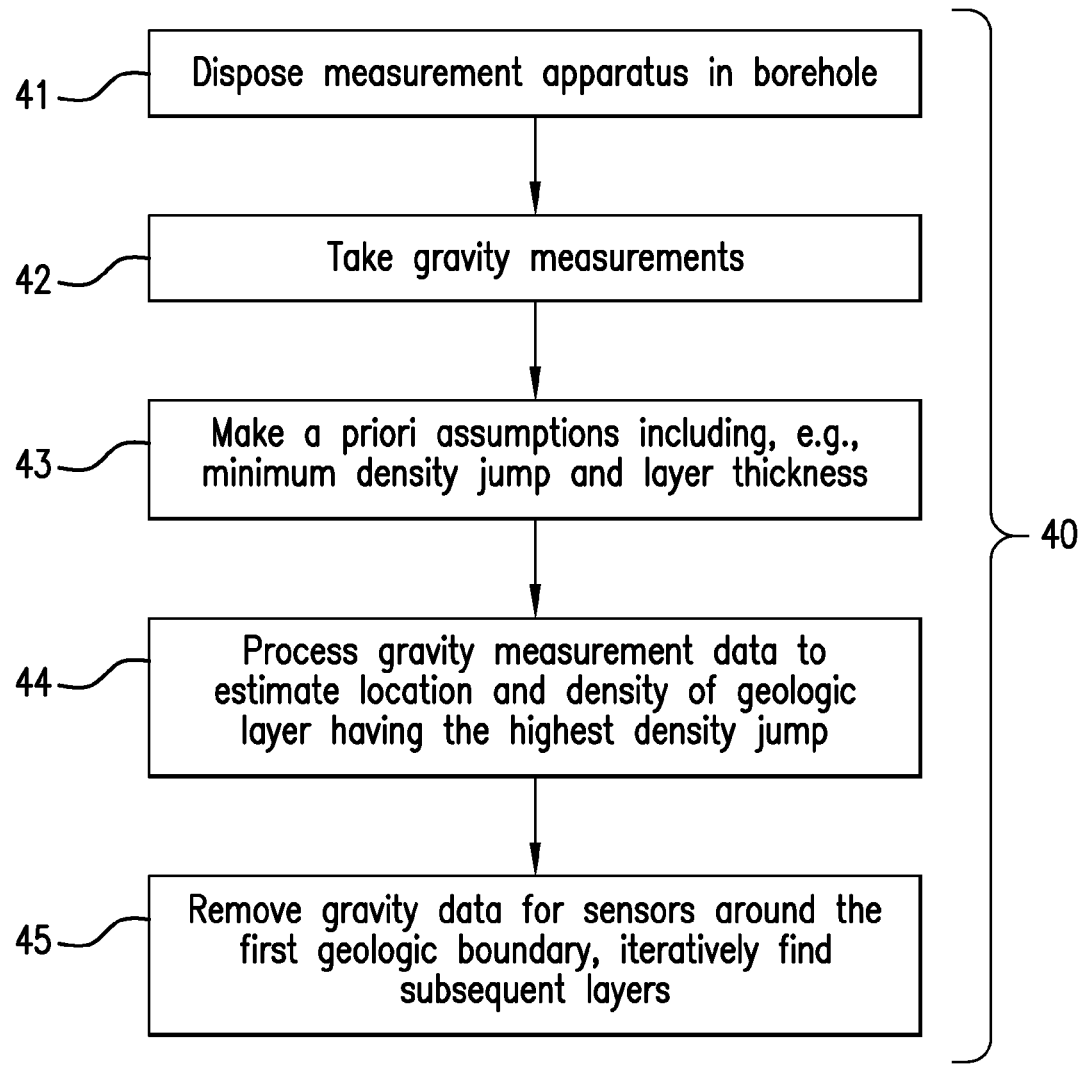
FIG. 4 is a flow chart providing an exemplary method of estimating properties of an earth formation including density and location of geologic boundaries.

One embodiment of a method 40 of estimating a geology of an earth formation, e.g., estimating a location and parameters of density boundaries and geologic layers, is shown in FIG. 4. The method 40 is used in conjunction with, for example, a plurality of gravity sensors, such as the measurement assembly 20 and/or the sensors 26, the data processing unit 22 and/or the surface processing unit 24. However, the method 40 may be utilized in conjunction with any suitable combination of processors and sensors. The method 40 includes one or more stages 41-45. In one embodiment, the method 40 includes the execution of all of stages 41-45 in the order described. However, certain stages may be omitted, stages may be added, or the order of the stages changed.

The method 40 and algorithms described in conjunction with the method 30 are used to, given borehole gravity data $g^\epsilon_j$, estimate the approximate locations $z_k^b$ of geological boundaries $z_k$. In one embodiment, a geological boundary is estimated to be located at a location at which the true density $\rho$ jumps from a first value to a second value. A "jump" may be defined as a change in density between two adjacent sensor locations that meets or exceeds a selected threshold. An example of such a jump is a change of density of about 0.2 g/cc.

In the first stage 41, a measurement apparatus such as the measurement assembly 20 is disposed in the borehole 12. The apparatus may be lowered into the borehole via any suitable conveyance, such as the borehole string 11 or a wireline. In one embodiment, the sensors 26 are absolute gravity sensors.

In the second stage 42, a plurality of measurements $g^\epsilon_j$ are taken over a selected time period. Each measurement $g^\epsilon_j$ includes a measurement from one of the plurality of sensors 26 at a selected point in time. For example, the measurement assembly 20 includes a number $N_s$ of gravity sensors 26 positioned at fixed offsets h. Measurement data representing the measurements $g^\epsilon_j$ are generated by or received at a processor, such as the surface processing unit 24.

In the third stage 43, in one embodiment, assumptions are made about the sought density that are utilized as a priori information. For example, it is assumed that the density jump $\Delta\rho$ associated with a boundary is high (for example, about 0.2 g/cc to about 0.3 g/cc) and the geologic layers are rather thick in terms of the acquisition step, e.g., there are a plurality of sensors located within a layer. In one embodiment, it is assumed that there are at least three sensors per layer. Thus, the method 30 in this embodiment determines the geological boundaries between thick layers with high density contrast and skips those between thin layers or having low density contrast.

In one embodiment, for measurement data that is noisy, i.e., includes location and/or measurement error, the method 30 includes a number of additional assumptions.

First, it may be assumed that the sensor measurement error $\xi_j$ is normally distributed with a zero mean and $|\xi_j|$ does not exceed some value $\epsilon^b$ with probability P close to one. For example, if $\epsilon^b$ equals the deviation of $\xi_j$ times 3, then $|\xi_j| \le \epsilon^b$ with probability P=0.997 according to the three sigma rule. For example, taking $\epsilon^b$ to be small, it is indicated that the data have little noise and the algorithm becomes more sensitive and finds more boundaries. However, if the data are noisy in fact, then these boundaries may be artifactual and a larger $\epsilon^b$ may be used.

Second, assumptions regarding density variation and expected layer thickness may be made. By regularizing, the vector $G_j$ (described below) is smoothed so that along the proper boundaries it begins to feel the other boundaries at some distance. Therefore, finding a certain geological boundary includes providing estimates for the density jump at the neighboring boundaries and the distance to them. This information is given by the density variation R and the expected minimum layer thickness T. It can be assumed that on every segment [a,b] ⊂ [$z_1^s, z_{N_s}^s$] the total density variation does not exceed R, i.e., the true density meets the inequality $$\left| \sum_{a \le z_k \le b} \Delta \rho_k \right| \le R, \qquad (5)$$

and $z_{k+1} - z_k \ge T$ for all k=1, ..., N. The value T and the distance h, also referred to as the acquisition step h, determine the expected number of sensors per layer p=[T/h]. In one embodiment, the expected number of sensors per layer is selected to be at least three. Here, [ ] stands for the integral part of the number p.

The algorithms described herein determine the presence of boundaries between a pair of sensors by checking some condition. Errors in data and the influence of the neighboring boundaries may force this condition to hold not for the selected pair of sensors but for the neighboring or even more distant pair. This deviation is greater if the density jump $\Delta \rho_k$ is small, the errors $\xi_j$ are large, or the neighboring boundaries are close. Therefore, a search neighborhood is indicated, i.e., the maximal distance B between the true boundary location $z_k$ and the sought approximate boundary $z_k^b$. If B is small, then the algorithm may fail to see the boundaries with small density jump. On the contrary, if B is large, then artifactual boundaries due to noise may arise. The value B and the acquisition step h determine the natural-valued parameter s=[B/h] used in the algorithm.

In the fourth stage 44, algorithms are utilized to analyze the gravity data and estimate the location and density change associated with one or more boundaries. An embodiment of the algorithm, assuming that the gravity measurements $g_j^\epsilon$ are error-free or the errors are minimal, is described below.

This embodiment, the method 40 uses the following expression for the gravity field (without the normal gradient):

$$g(z) = \sum_{k=1}^{N} g^k(z) + \bar{g}, \qquad (5)$$

where:

$$g^k(z) = -4\pi G \theta^1(z - z_k) \Delta \rho_k, \qquad (6)$$

$$\bar{g} = 2\pi G \sum_{k=1}^{N-1} \rho_k (z_{k+1} - z_k),$$

and:

$$\Delta \rho_k = \rho_k - \rho_{k-1}, \qquad (7)$$
$$\rho_0 = 0,$$
$$\rho_N = 0,$$
$$\theta^1(z) = \begin{cases} z & z \ge 0, \\ 0 & z < 0. \end{cases}$$

This representation emphasizes that g(z) is a piecewise linear function whose breaks depend on density changes or jumps $\Delta \rho_k$. For field data contaminated with errors, it means that $$g_j^\epsilon = g_j + \xi_j, \qquad (8)$$

$$g_j = \sum_{k=1}^{N} g^k(z_j) + \bar{g}.$$

The presence of a boundary (for exact, error-free data) becomes evident if the second difference $D^2 g$ of the sequence of sensor measurements $g_j$ is determined:

$$G_j = (D^2 g)_j = \frac{g_{j+1} - 2g_j + g_{j-1}}{h^2}. \qquad (9)$$

This second difference sequence is denoted as $G_j$. The algorithm assumes that the boundary depth $z_k$ lies between the sensors (having sensor numbers $n_k$ and $n_{k+1}$) located at depths $z_{n_k}$ and $z_{n_k+1}$, and has a relative location $\lambda_k$ between $z_{n_k}$ and $z_{nk}+1$, where $\lambda_k = (z_k - z_{n_k})/h$. If each layer contains at least three sensors, i.e., $n_k+2<n_{k+1}$, then $$G_j = -\frac{4\pi G}{h} \begin{cases} \Delta \rho_k (1 - \lambda_k), & j = n_k, \\ \Delta \rho_k \lambda_k, & j = n_k + 1, \\ 0 & \text{otherwise,} \end{cases} \qquad (10)$$

and the nonzero elements of $G_1$ corresponding to the presence of boundaries are separated by zero elements. Thus, $z_k$ and $\Delta \rho_k$ can be estimated as follows. If $G_j + G_{j+1} \ne 0$ and $G_{j-1} = G_{j+2} = 0$, then between $z_j$ and $z_{j+1}$ there is a boundary z which is found by the formula:

$$z = z_j^s + \frac{G_j}{G_j + G_{j+1}} h; \qquad (11)$$

and the density jump is found by the formula $$\Delta \rho = -\frac{h}{4\pi G}(G_j + G_{j+1}). \qquad (12)$$

Figure 5:
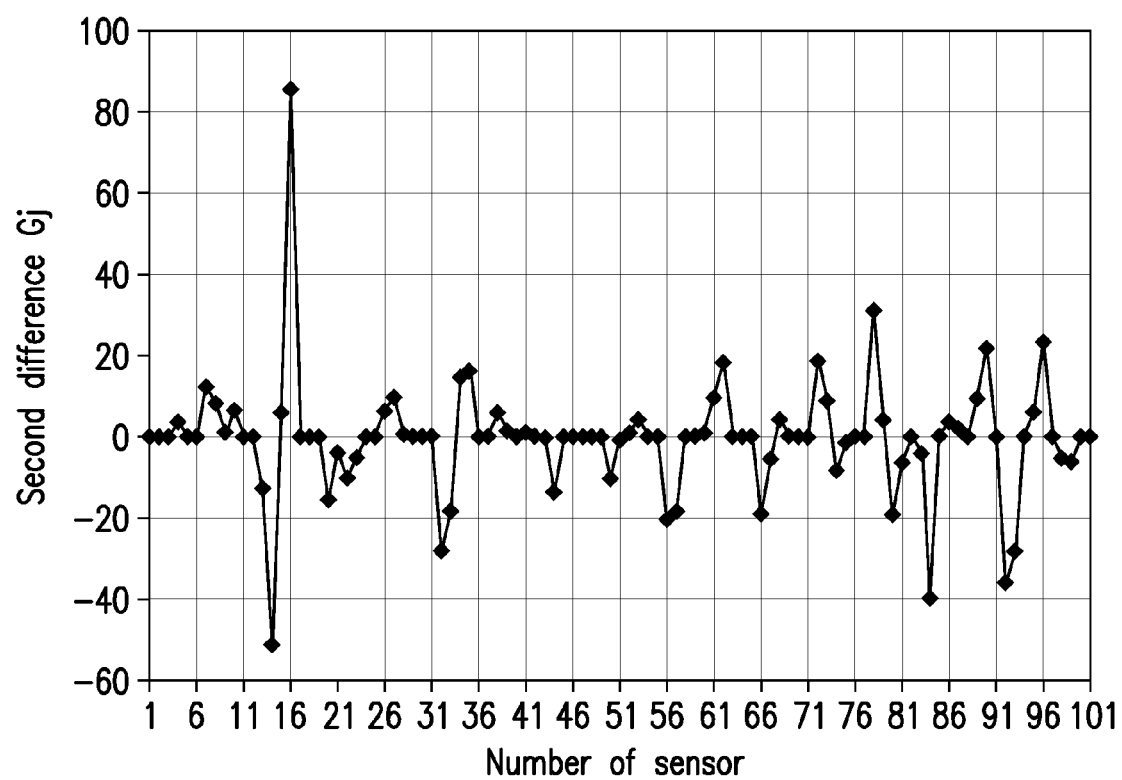
FIG. 5 is a graph of data generated from exemplary downhole gravity measurements.

An example of second difference $G_j$ data for simulated error-free gravity data is shown in FIG. 5. The data were generated from a density model and the calculations were performed using an array of gravity sensors having a separation (h) of one meter. Data represented in FIG. 5 demonstrate that formation boundaries can be clearly revealed using the algorithms described herein. For example, the above algorithm is used to identify boundaries that are located and shown as peaks near sensors with numbers 4, 27, 44) provided the layers around each revealed boundary are thick enough to obtain three gravity measurements within the layer.

Another embodiment of the method 40 is described for the general case of measurement data that includes errors. An algorithm is derived by regularization, for example, by taking the convolution of $G_j$ with some delta-like sequence and performing an analysis to determine which density contrasts ($\Delta \rho$) can be distinguished from data artifacts resulting from errors (e.g., measurement errors and depth errors). The geological boundaries are estimated iteratively starting with the boundary with the greatest density jump $\Delta \rho_k$ and ending with those distinguishable from the artifacts resulting from noise.

The data used in this embodiment are considered noisy data, where each gravity measurement includes some error and can be represented by $g_j^\epsilon = g(z_j^s) + \xi_j$. $\xi_j$ is an error related to measurement and/or position errors associated with the gravity sensors 26.

In this embodiment, the second difference vector $G_j$ includes some error and is denoted by $G_j^\epsilon$. Some regulariza tion is applied to the second difference of the gravity data series. The second difference may be represented by:

$$G_j^\epsilon = \frac{g_{j-1}^\epsilon - 2g_j^\epsilon + g_{j+1}^\epsilon}{h^2} \quad (13)$$

In one embodiment, $G_j^\epsilon$ is smoothed by taking the convolution with the two-sided sequence K(q) having elements $K_j(q) = Qq^{|j|}$, where $0 \leq q < 1$ and $j = 0, \pm 1, \pm 2, \ldots$, and the value $Q = (1-q)/(1+q)$ is chosen from the condition $$\sum_{l=-\infty}^{+\infty} K_l(q) = 1.$$

The convolution of the second difference is denoted by $C_j$, and an approximate density change $V_j$ can be derived based on the following equations:

$$C_j = \sum_{l=1}^{N_s} K_{j-l}(q) G_l^\epsilon, \quad (14)$$

$$j = 1, \ldots, N_s \text{ (or } C = K(q) * G^\epsilon);$$

$$V_j = \frac{h}{4\pi G(q-1)}(C_j + C_{j+1}), \quad j = 1, \ldots, N_s - 1. \quad (15)$$

Where "q" is a regularization parameter and $N_s$ is the number of sensors. As can be seen from the above equations, a value of $q=0$ results in $C_j = G_j^\epsilon$.

By linearity, C can be represented by:

$$C = \sum_{k=1}^{N} \underbrace{K(q) * G^k}_{C^k} + K(q) * (D^2 \xi), \quad (16)$$

where $G^k$ denotes the vector with elements $G_j^k$, and $j = 1, \ldots, N_s$, and $G_j^k$ is the second difference at some boundary "k", which is denoted by $n_k$. The vector $C^k = K(q) * G^k$ corresponds to the k th boundary and has the components:

$$C_j^k = -\frac{4\pi G Q}{h} \Delta \rho_k \begin{cases} (1 - \lambda_k + q\lambda_k)q^{n_k - j}, & j \leq n_k, \\ (q(1-\lambda_k) + \lambda_k)q^{j-n_k-1}, & j \geq n_k + 1, \end{cases} \quad (17)$$

A vector $E = K(q) * (D^2 \xi)$ can be derived and has the components:

$$E_j = \sum_{l=1}^{N_s} S_{j-l}(q) \xi_l, \quad (18)$$

$$S_j(q) = \frac{Q(1-q)}{h^2} \begin{cases} -2, & j = 0, \\ (1-q)q^{|j|-1}, & j \neq 0. \end{cases}$$

For some fixed boundary $n_K$ having a location $z_K$, the components of C and V, with numbers close to $n_K$ can be shown as:

$$C_j = \quad (19)$$
$$-\frac{4\pi G Q}{h}\left[\Delta\rho_K\begin{Bmatrix}(1-\lambda_K+q\lambda_K)q^{n_K-j}, & n_{K-1}+1 \leq j \leq n_K \\ (q(1-\lambda_K)+\lambda_K)q^{j-n_K-1}, & n_K+1 \leq j \leq n_{K+1}\end{Bmatrix} +\right.$$

$$\sum_{k=1}^{K-1} \Delta\rho_k(q(1-\lambda_k)+\lambda_k)q^{j-n_k-1} +$$

$$\left.\sum_{k=K+1}^{N} \Delta\rho_k(1-\lambda_k+q\lambda_k)q^{n_k-j}\right] + E_j$$

$$V_j = \frac{h}{4\pi G(q-1)}(C_j + C_{j+1}) \quad (20)$$

$$= \Delta\rho_K \begin{Bmatrix} 1, & j = n_K \\ (1-\lambda_K+q\lambda_K)q^{n_K-j-1}, & n_{K-1}+1 \leq j \leq n_K-1 \\ (q(1-\lambda_K)+\lambda_K)q^{j-n_K-1}, & n_K+1 \leq j \leq n_{K+1}-1 \end{Bmatrix} + +$$

$$\sum_{k=1}^{K-1} \Delta\rho_k(q(1-\lambda_k)+\lambda_k)q^{j-n_k-1} +$$

$$\sum_{k=K+1}^{N} \Delta\rho_k(1-\lambda_k+q\lambda_k)q^{n_k-j-1} + \frac{h(E_j + E_{j+1})}{4\pi G(q-1)}.$$

In this embodiment, $\lambda_K = (z_K - z_j)/h$ for an approximate boundary $n_K$ located between sensors at depths $z_j^s$ and $z_{j+1}^s$. The following notations can be defined from the above equations:

$$A_K^-(q) = \sum_{k=1}^{K-1} \Delta\rho_k(q(1-\lambda_k)+\lambda_k)q^{n_K-n_k-1}, \quad (21)$$

$$A_K^+(q) = \sum_{k=K+1}^{N} \Delta\rho_k(1-\lambda_k+q\lambda_k)q^{n_k-n_K-1}, \quad (22)$$

$$f_{K,l}(q) = \begin{cases} 1, & l = 0 \\ (1-\lambda_K+q\lambda_K)q^{-l-1}, & n_{K-1}-n_K+1 \leq l \leq -1 \\ (q(1-\lambda_K)+\lambda_K)q^{l-1}, & 1 \leq l \leq n_{K+1}-n_K-1 \end{cases} \quad (23)$$

$$e_{K,l}(q) = A_K^-(q)q^l + A_K^+(q)q^{-l} + \frac{h(E_{n_K+l} + E_{n_K+l+1})}{4\pi G(q-1)}, \quad (24)$$

Using the above equations, the following density change formula can be derived:

$$V_{n_K+l} = \Delta\rho_K f_{K,l}(q) + e_{K,l}(q), n_{K-1} - n_K + 1 \leq l \leq n_{K+1} - n_K - 1. \quad (25)$$

As can be seen, for $\epsilon = 0$ and $q = 0$, the error function $e_{K,l}(q) = 0$, and the same formulas as in the case of exact or error-free data can be used to estimate the location and density jump of a boundary.

In the case of noisy data, the algorithm includes making the error term $e_{K,l}(q)$ as small as possible by proper choice of the regularization parameter q, grounding on the assumptions described above. To this end, each term in $e_{K,l}(q)$ is estimated separately. To estimate $e_{K,l}(q)$, the algorithm begins with the last term, related to the sensor measurement error (i.e., the last term of equation (24)). A random variable $E_j + E_{j+1}$ is obtained from $\xi_j$ by convolution:

$$E_j + E_{j+1} = \sum_{l=1}^{N_s} S_{j-l}^1(q)\xi_l,$$

-continued $$S_j^1(q) = \frac{(1-q)^2}{h^2} \begin{cases} -1, & j = 0, -1, \\ (1-q)q^{j-1}, & j \geq 1, \\ (1-q)q^{-j-2}, & j \leq -2. \end{cases}$$

If the value $\epsilon$ is the deviation of $\xi_j$, then the deviation of $$E_j + E_{j+1} \text{ equals } \epsilon \sqrt{\sum_{l=1}^{N_s} (S_{j-l}^1(q))^2}.$$

By computing:

$$\sum_{l=-\infty}^{+\infty} (S_l^1(q))^2 = \frac{4(1-q)^2}{h^4(1+q)},$$

the following estimate is obtained:

$$|E_j + E_{j+1}| \leq \frac{2(1-q)^2}{h^2\sqrt{1+q}}$$

with probability P, and thus the last term of the equation for $e_{K,l}(q)$ is estimated as:

$$\left|\frac{h(E_{n_K+l} + E_{n_K+l+1})}{4\pi G(q-1)}\right| \leq \frac{2(1-q)}{4\pi Gh\sqrt{1+q}}$$

with probability P.

The algorithm continues by estimating the first terms in $e_{K,l}(q)$. Using Abel's identity for series, the following can be derived:

$$|A_K^+(q)| = |\Sigma \Delta \rho_k (1-\lambda_k + q\lambda_k) q^{n_k - n_K - 1}| \leq Rq^{n_{K+1} - n_K - 1} \leq Rq^{p-1}.$$

Similarly, $|A_K^-(q)| \leq Rq^{p-1}$. The estimate for $e_{K,l}(q)$ can then be represented by the following (which holds with probability P):

$$|e_{K,l}(q)| \leq Rq^{p-1}(q^l + q^{-l}) + \frac{\epsilon^b(1-q)}{2\pi Gh\sqrt{1+q}} = \overline{e}_l(q).$$

Figure 6:
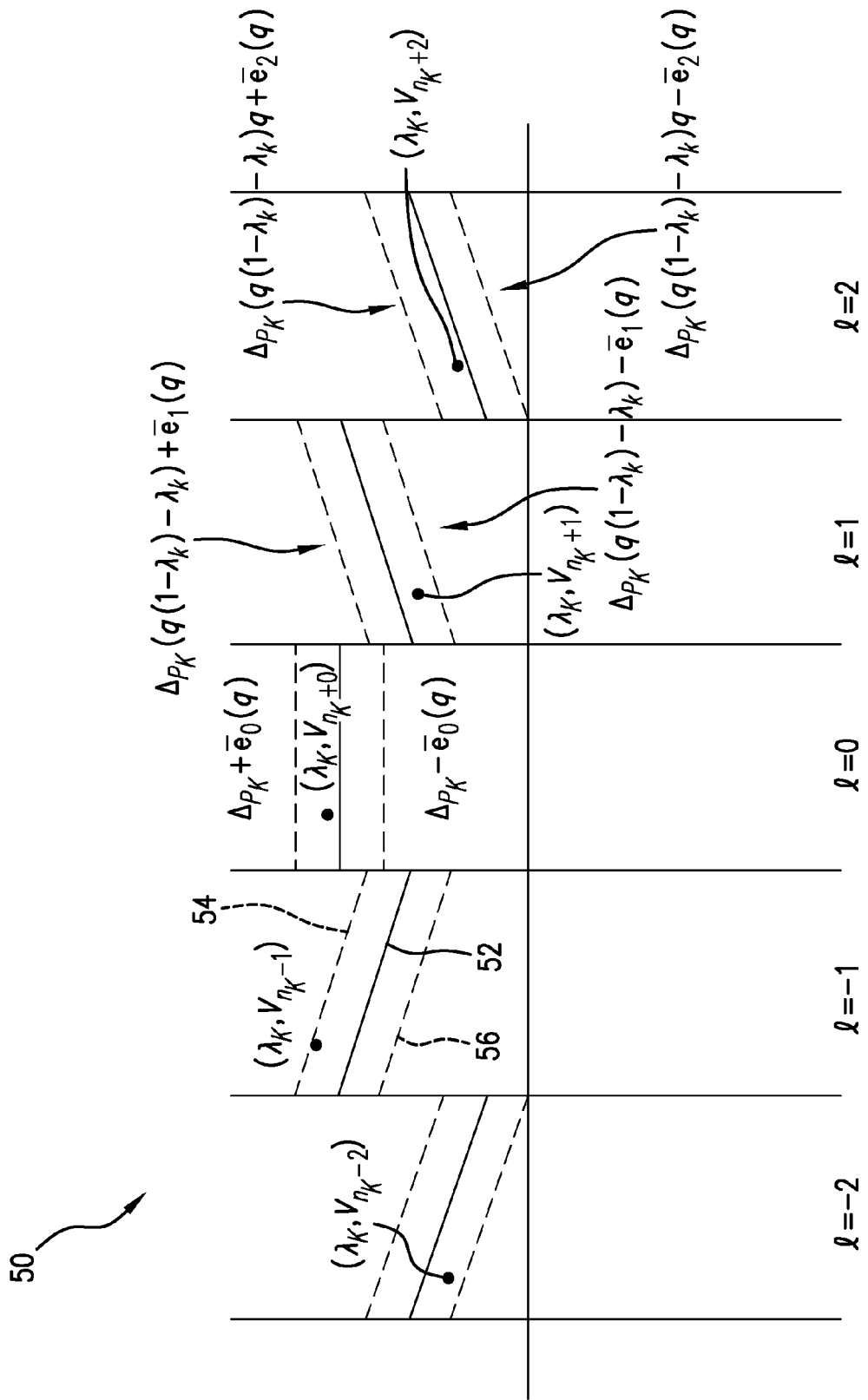
FIG. 6 illustrates a portion of a method of estimating a geologic boundary relative to a downhole sensor location.

FIG. 6 illustrates a graphic illustration 50 of the values $V_j$, which illustrate use of the algorithm to minimize the error term $e_{K,l}(q)$ in order to localize the geological boundaries, i.e., find pairs of sensors between which a boundary is located. For each value of l, a graph 52 of $\Delta \rho_K f_{K,l}(q)$ as a function of $\lambda_K$ is shown, along with a graph showing the function raised by the value $\overline{e}_l(q)$ and lowered by the value $\overline{e}_l(q)$, denoted as graphs 54 and 56, respectively.

The pair $(\lambda_K, V_{n_K+l})$ always lies within the corresponding strip defined by graphs 54 and 56. In the case of error-free data, then $\epsilon^b = 0$ and $q=0$, and $V_{n_K} = \Delta \rho_K$ and the other $V_{n_K+l}$ with small l are zero. Thus, $|V_j|$ attains a maximum at $j=n_K$.

In the case in which error is present, the algorithm includes making $\overline{e}_l(q)$ small by choosing a value of q so that $|V_j|$ attains its maximum at $j=n_K$ (or neighboring values of j). From FIG. 6 it is shown that this is not always possible in the case of noisy data, and the maximum may shift to the neighboring point. More precisely, if $$\Delta \rho_K - \overline{e}_0(q) > \Delta \rho_K q^s + \overline{e}_{s+1}(q),$$

or similarly, $$\Delta \rho_K > F_s(q) = \frac{\overline{e}_0(q) + \overline{e}_{s+1}(q)}{1 - q^s},$$

then $|V_j|$ attains a maximum at one of the points located at some interval "s" from the approximate boundary $n_K$, i.e., $j=n_K-s, \ldots, n_K+s$. In this embodiment, the parameter q is chosen so as to make $F_s(q)$ minimal. Once the minimum point "$q^*$" is found, the density jumps $\Delta \rho$ of the geological boundaries that can be localized to within s sensor intervals must satisfy the inequality:

$$|\Delta \rho_K| > F_s(q^*)$$

and the corresponding maximal value $|V_j|$, must satisfy the inequality:

$$|V_j| > F_s(q^*) - \overline{e}_0(q^*) = V^*.$$

Moreover, $|V_j - \Delta \rho_K| \leq \overline{e}_0(q^*)$. It is thus concluded that the newly found boundary lies between $z_j^s$ and $z_{j+1}^s$ and $V_j$ is its approximate density jump. Precise location of the boundary within the interval is more subtle. In the trivial case $\epsilon=0$ and $q=0$ the position $\lambda$ is given by the formula:

$$\lambda = \frac{C_{j+1}}{C_{j+1} + C_j} = \frac{1}{2}\left(1 + \frac{C_{j+1} - C_j}{C_{j+1} + C_j}\right);$$

In the case when $\epsilon=0$, $q>0$, and the neighboring boundaries are absent, the position is given by the formula:

$$\lambda = \frac{1}{2}\left(1 + \frac{1+q}{1-q} \frac{C_{j+1} - C_j}{C_{j+1} + C_j}\right)$$

In the case of noisy data, this formula may give values outside the interval [0,1]. To cope with such a result, the formula for estimating the location between $z_j^s$ and $z_{j+1}^s$ is modified as follows:

$$\lambda = \Lambda\left(\frac{1+q}{1-q}, \frac{C_{j+1} - C_j}{C_{j+1} + C_j}\right),$$

$$\Lambda(\alpha, t) = \frac{1}{2}(1 + \alpha t + (1 - \alpha)t^3),$$

always getting values in the interval [0,1].

In the fifth stage 45, in one embodiment, once some boundaries $n_K$ are found, their contribution is subtracted from the measured gravity field and the next boundary is estimated.

For example, a number $N_b$ of boundaries have been estimated according to stage 34, each having a depth "$z_k^b$" and a density jump "$\Delta \rho_k^b$". The sensor number immediately preceding (i.e., uphole) the boundary is denoted by "$n_k^b$", such that $z_{n_k^b}^s \leq z_k^b < z_{n_k^b+1}^s$. Addition of the next boundary is carried out as follows:

First, the maximum density variation R* is selected as $R^* = \max\{R, |\Delta \rho_1|, |\Delta \rho_2|, \ldots, |\Delta \rho_{N_b}|\}$. The minimum point q* of the function Fs is calculated as described above, but using the density variation R*, i.e., using $F_s(q;\epsilon^b,R^*,p)$. V* is then calculated as described above using R*, i.e.:

$$V^* = F_s(q^*;\epsilon^b,R^*,p) - \bar{e}_0(q^*;\epsilon^b,R^*,p).$$

The vectors G*, C, and V are calculated. As shown below, the elements of G* are calculated by subtracting the value of $G_j$ found for each boundary $N_b$, which is denoted by $G_j^{bk}$. These vectors are calculated based on the following equations:

$$G_j^* = \frac{g_{j-1}^\epsilon - 2g_j^\epsilon + g_{j+1}^\epsilon}{h^2} - \sum_{k=1}^{N_b} G_j^{bk}, \; j = 2, \ldots, N_s - 1,$$

$$G_1^* = \frac{-g_1^\epsilon + g_2^\epsilon}{h^2} - \sum_{k=1}^{N_b} G_1^{bk},$$

$$G_{N_s}^* = \frac{g_{N_s-1}^\epsilon - g_{N_s}^\epsilon}{h^2} - \sum_{k=1}^{N_b} G_{N_s}^{bk},$$

where $$G_j^{bk} = -\frac{4\pi G \Delta \rho_k^b}{h} \begin{cases} 1 - \lambda_k^b, & j = n_k^b, \\ \lambda_k^b, & j = n_k^b + 1, \\ 0 & \text{otherwise,} \end{cases}$$

$$C_j = \sum_{l=1}^{N_s} K_{j-l}(q^*) G_l^*, \; j = 1, \ldots, N_s,$$

and $$V_j = \frac{h}{4\pi G(q^*-1)} (C_j + C_{j+1}), \; j = 1, \ldots, N_s - 1.$$

Similarly to the method described in stage 34, the maximum point $j=j^*$ of $|V_j|$ is then found, corresponding to another boundary $N_{b+1}$, and the boundary location λ of the boundary $N_{b+1}$ is determined as described above.

If the condition $V_{j^*}|>V^*$, then the $N_b+1$th boundary is added, having a location and density jump as follows:

$$n_{N_b+1}^b = j^*,$$
$$\lambda_{N_b+1}^b = \Lambda\left(\frac{1+q^*}{1-q^*}, \frac{C_{j+1}-C_j}{C_{j+1}+C_j}\right),$$
$$z_{N_b+1}^b = z_{j^*}^s + \lambda_{N_b+1}^b h,$$
$$\Delta\rho_{N_b+1}^b = V_{j^*}.$$

However, if the condition $|V_{j^*}|>V^*$ is violated, then no boundary is added and the algorithm stops. Stage 45 may then be repeated until no more boundaries satisfying the above conditions are found.

In addition to the method 30 for finding the locations and density changes associated with geologic boundaries, there is also described a method of inverting borehole gravity data, referred to herein as a regularized density method with prelocated boundaries (RDB method).

If the true locations of all geological boundaries were given with good accuracy or all of the locations are revealed by the method proposed above, then the boundaries could be taken alone and the borehole gravity data inverted. In some embodiments, it may not be possible to guarantee that the above method finds all geological boundaries. The RDB method is provided A first stage of the RDB method includes assuming a priori that the layers are thick enough as compared with the acquisition step (i.e., distance between gravity sensors) "h" (e.g., at least 3 sensors per layer). Using the gravity data, estimate boundaries as far as possible using the method 40. For example, find the geological boundaries $z_k$ (including obtained estimated boundaries $z_k^b$) and add them to a set of model boundaries $z_k^m$ originally obtained from, for example, the uniform partition of an observation interval $[z_1^s, z_{N_s}^s]$ into $(N_s-1)M$ parts. The method for finding $z_k^b$ is described above as method 30 for both error-free and noisy data.

A second stage of the RDB method includes solving the following minimization problem:

$$\sum_{j=1}^{N_s} \left(\sum_{k=1}^{(N_s-1)M} a_{jk}\rho_k^m - g_j^\epsilon\right)^2 +$$

$$\alpha \sum_{k=1}^{(N_s-1)M} \left(\rho_k^m - \rho_k^{ref}\right)^2 + \beta \sum_{k=1}^{(N_s-1)M-1} w_k(\rho_{k+1}^m - \rho_k^m)^2 \to \min.$$

where $A=(a_{jk})$ is the response matrix with entry $a_{jk}$ equal to $g_k^{slab}(z_j^s)$ where $\rho_k$ is the unit density and $z_k$ are replaced with $z_k^m$. The parameter α controls the closure of the sought density to the reference model $\rho^{ref}$ given a priori assumptions (the average density in the simplest case), and β is responsible for smoothing, i.e., closure of the densities in the neighboring model layers. The function $w_k$ is defined as:

$$w_k = \begin{cases} 0 & \text{if } z_k^m \text{ is one of } z_k^b, \\ 1 & \text{otherwise.} \end{cases}$$

Thus, the set of model boundaries $z_k^m$ contains two types of points:
1. The points obtained from the uniform partition of the observation interval $[z_1^s, z_{N_s}^s]$ into $(N-1)M$ parts; in particular, including the sensor points $z_k^s$; and
2. The approximate boundary points $z_k^b$ found at the first stage.

The points of type 1 are needed to provide flexibility of $\rho^m$; and addition of the points $z_k^b$ lets $\rho^m$ have jumps near the true geological boundaries.

In one embodiment, the RDB method uses the properties of the gravity field measured in a borehole and a priori information about the geological layers. An example of such a priori information here is a relation H/h≥3 for the layer thickness H and the acquisition step h and high density contrast at the geological boundaries (e.g., the critical density contrast depends on the sensor error and spacing and is on the order of 0.2 g/cc).

The apparatus and methods described herein provide various advantages over prior art techniques. For example, the apparatuses and methods provide for estimating locations and densities of geologic boundaries with a high accuracy, as well as distinguishing density jumps indicating a boundary from those due to noise.

In addition, the RDB inversion method exhibits superior accuracy relative to other methods. For example, FIGS. 7-11 demonstrate the accuracy of the RDB method in relation to the prior art apparent density (AD) method. In these examples, the AD and RDB inversion methods are compared according to their accuracy, i.e., the difference $|\rho^m(z) - \rho(z)|$ between the found density $\rho^m$ and the true density $\rho$. One technique to find this difference includes computing the mean square error (MSE):

$$MSE(\rho^m) = \left( \frac{1}{z_{N_m}^m - z_1^m} \int_{z_1^m}^{z_{N_m}^m} |\rho^m(z) - \rho(z)|^2 dz \right)^{1/2}.$$

In addition, to have a complete picture of the errors, following error distribution function (EDF) is also calculated:

$$EDF(t) = \frac{\text{total length of the intervals, where } |\rho^m(z) - \rho(z)| \geq t}{z_{N_m}^m - z_1^m}$$

which indicates at how many points (in percent) the error exceeds a given level "t". The function EDF(t) is always non-increasing; and a smaller EDF(t) means better accuracy.

The comparison includes following steps. First, generate borehole gravity data using, e.g., a given density model, and contaminate the data with Gaussian noise of level "ϵ". Second, invert the borehole data using both AD and RDB methods. Lastly, compare inverted densities with the true density $\rho$, calculating the mean square error and plotting the error distribution function EDF(t).

In the RDB method, the regularization parameter β is chosen by the well-known residual principle:

$$\sum_{j=1}^{N_S} |g_j^e - g_j^m|^2 = \varepsilon^2,$$

where $g_j^m$ are the gravity data corresponding to found density. The reference model $\rho^{ref}$ is the average density computed from the whole set of gravity data. The first regularization parameter α is taken to be a small number to avoid singularity of the system of equations.

Exemplary results of the comparison are shown in FIGS. 7-10. A series of experiments were carried out on modeled gravity data using various values of sensor error and sensor spacing as shown in the following Table 1:

| Case | MSE, g/cc | Sensor error, ϵ, μGal | Sensor spacing, h, m | Method | Figure |
|---|---|---|---|---|---|
| 1 | 0.037 | 1 | 1 | RDB | 2 |
| 2 | 0.066 | 1 | 1 | AD | 2 |
| 3 | 0.067 | 3 | 1 | RDB | 3 |
| 4 | 0.068 | 5 | 0.5 | RDB | 4 |
| 5 | 0.075 | 5 | 1 | RDB | 5 |
| 6 | 0.080 | 3 | 1 | AD | 6 |
| 7 | 0.098 | 3 | 3 | RDB; RD | 6 |
| 8 | 0.104 | 5 | 1 | AD | 5 |
| 9 | 0.107 | 3 | 3 | AD | 6 |
| 10 | 0.168 | 5 | 0.5 | AD | 4 |

Figure 7:
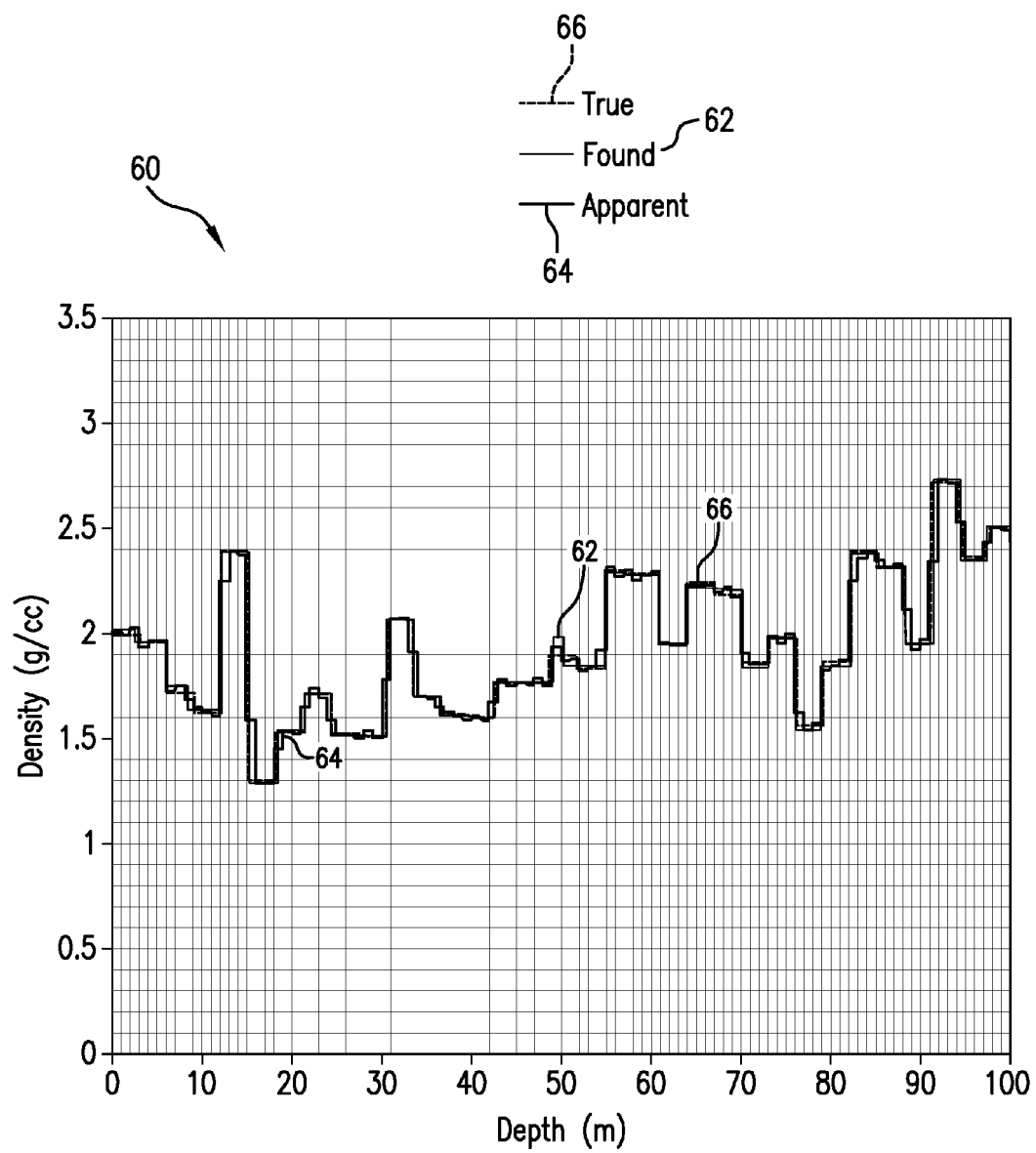
FIG. 7 is a graph of exemplary density data illustrating a comparison between a method of inverting gravity data and a prior art apparent density method.

FIG. 7 shows the results 60 of estimating density using the RDB inversion method (line 62) and AD inversion method (line 64) as compared to the true density (line 66). These results are calculated for a sensor error of 1 μGal and sensor spacing of 1 m. The vertical gridlines indicate sensor positions. Both methods show very good agreement with the true density. The MSE's of the RDB and AD methods are 0.037 g/cc and 0.066 g/cc, respectively.

Figure 8:
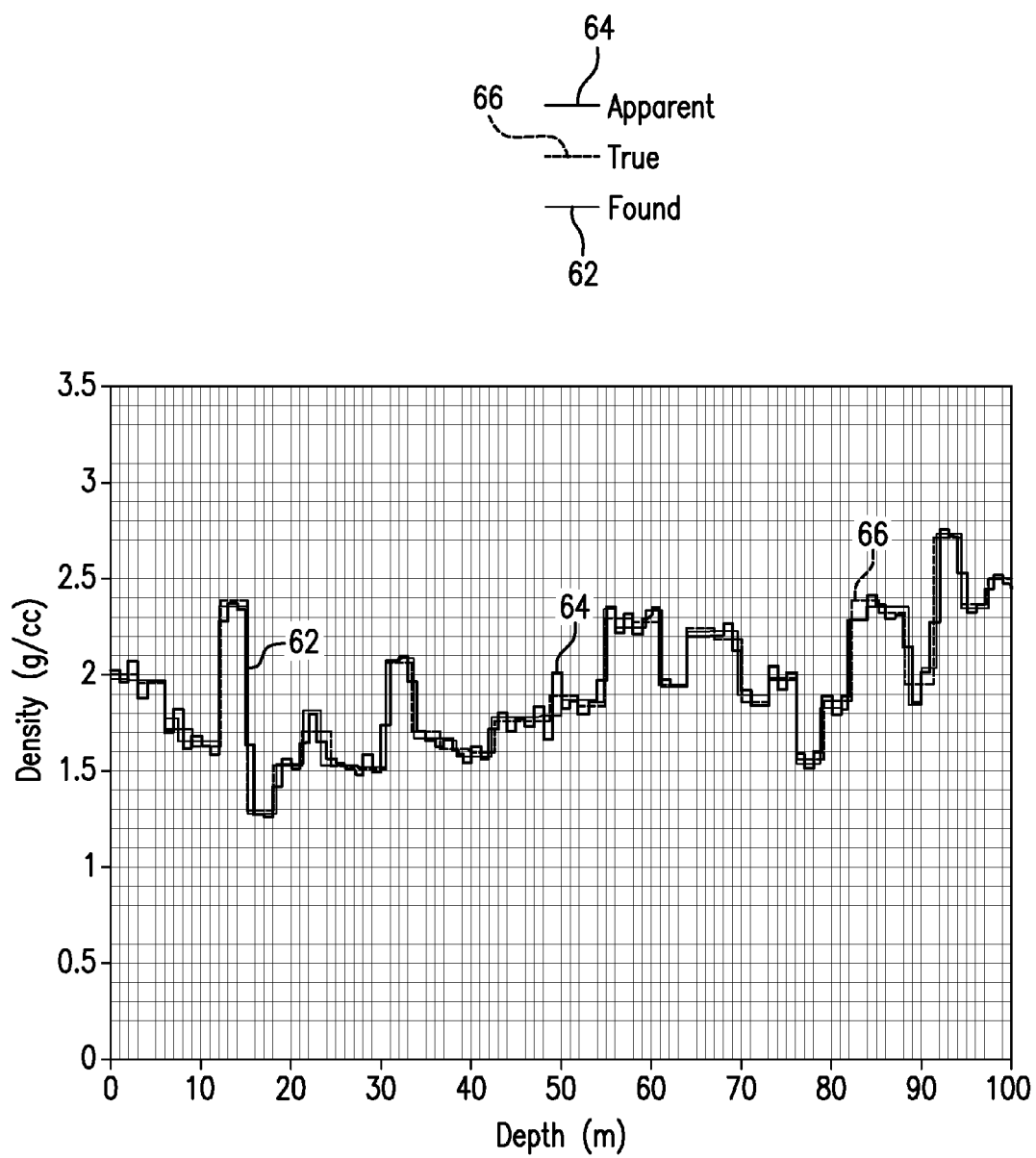
FIG. 8 is a graph of exemplary density data illustrating a comparison between a method of inverting gravity data and a prior art apparent density method.

FIG. 8 shows the results of RDB and AD inversion methods for a sensor error of 3 μGal and a sensor spacing of 1 m. The AD method results in this case show artifactual oscillations. The RDB method demonstrates good layer boundary location, smoothing the density within the layer. The MSE's of the RDB and AD methods are 0.067 g/cc and 0.08 g/cc, respectively. Observe that the MSE of the RDB in this case is almost the same as that of the AD for 1 μGal shown in FIG. 7.

Figure 9:
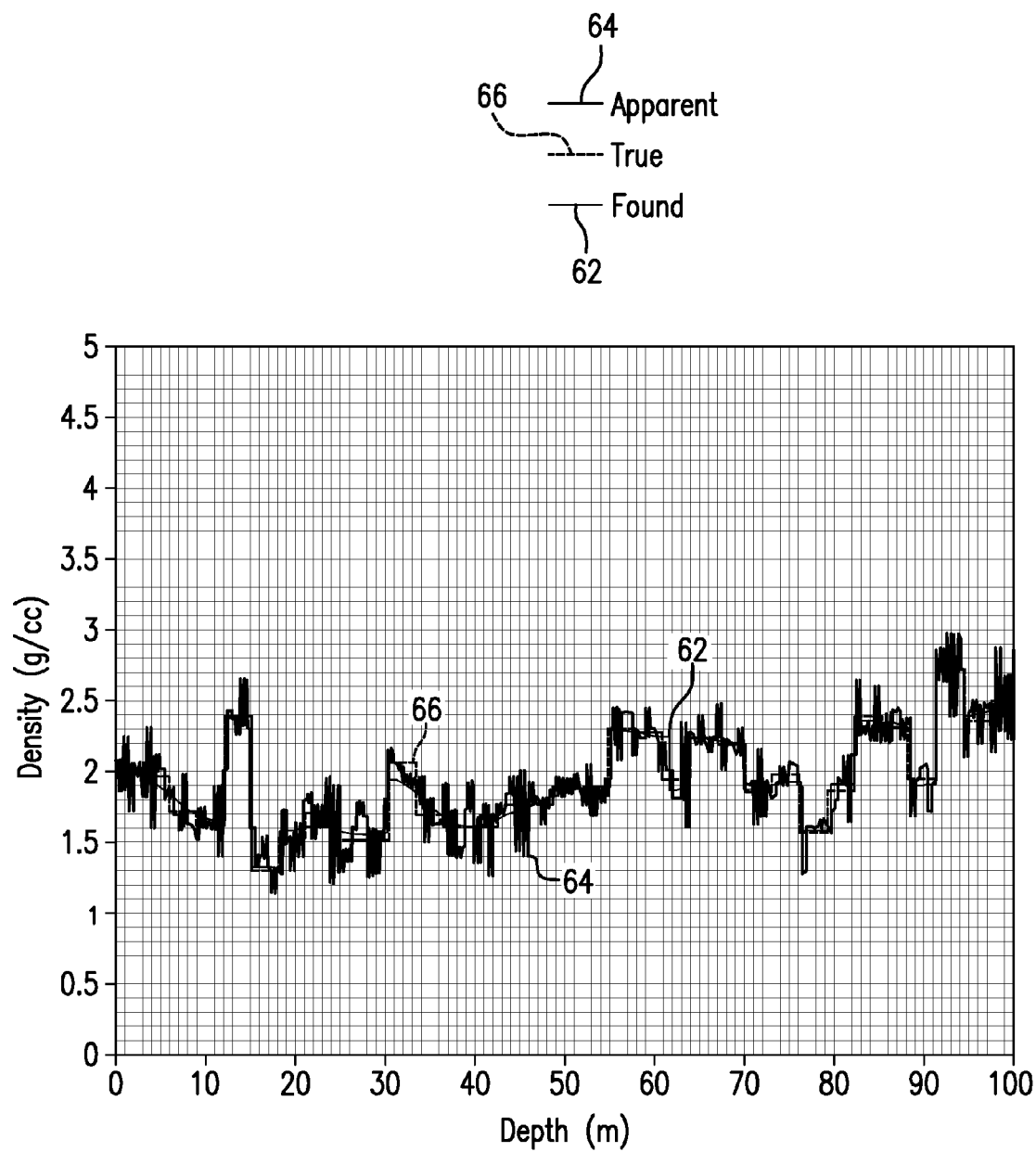
FIG. 9 is a graph of exemplary density data illustrating a comparison between a method of inverting gravity data and a prior art apparent density method.

FIG. 9 shows the results of RDB and AD inversion methods for a sensor error of 5 μGal and a sensor spacing of 0.5 m. It is noted that sensors are located at depths represented by the vertical gridlines and between the vertical gridlines. These results show that large sensor error and small sensor spacing leads to very large errors in the AD method (MSE=0.168 g/cc). On the contrary, the RDB method, even for a large sensor error, demonstrates its ability to locate the boundaries for small sensor spacing (MSE=0.068 g/cc).

Figure 10:
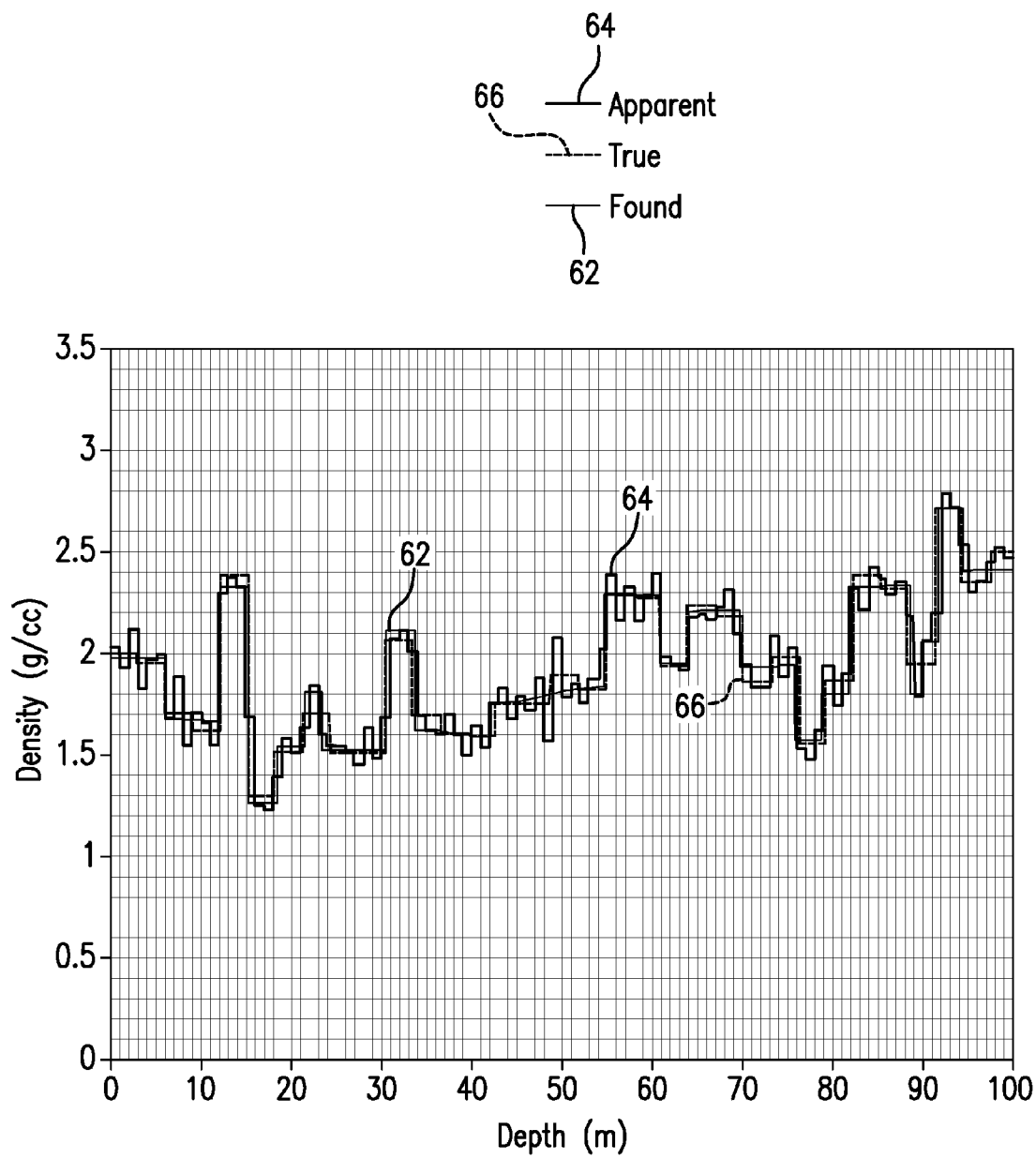
FIG. 10 is a graph of exemplary density data illustrating a comparison between a method of inverting gravity data and a prior art apparent density method.

FIG. 10 shows the results of RDB and AD inversion methods for a sensor error of 5 μGal and a sensor spacing of 1 m. The MSE of the RDB and AD is 0.075 g/cc and 0.104 g/cc, respectively. The RDB method still can locate some boundaries. Between the boundaries the density is smoothed.

The above experimental results demonstrate the advantages of the RDB method. It is shown that smaller sensor error and sensor spacing leads to less mean square error and better reconstruction of the density distribution. For the fixed sensor error and sensor spacing, the RDB method always gives better accuracy than the AD method.

Density errors in the AD method appear for two reasons: for a large value of h the sensor may stand far away from the true layer boundaries and for small values of h even moderate sensor error leads to artifactual oscillations due to the ill-posedness of the problem. The RDB method has the power to cope with both shortcomings of the apparent density: first it locates the boundaries with large density jumps and then uses regularization to smooth the density within the layers.

As described herein, "borehole" or "wellbore" refers to a single hole that makes up all or part of a drilled well. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area) including the fluids contained therein. Furthermore, various drilling or completion service tools may also be contained within this borehole or wellbore, in addition to formations.

In addition, it should be noted that "drillstring" or "string" as used herein, refers to any structure or carrier suitable for lowering a tool through a borehole or connecting a drill bit to the surface, and is not limited to the structure and configuration described herein. For example, the borehole string 11 is configured as a hydrocarbon production string or formation evaluation string. Furthermore, although the assembly 20 is described as being disposed in or in communication with a borehole, the assembly 20 is not limited. The assembly 20 may be utilized for any desired surface or downhole pressure measurement and may be incorporated into or disposed with any suitable carrier. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's, drill string.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of estimating a geology of an earth formation, the method comprising:

receiving gravity measurements from each of a plurality of gravity sensors $n^s_j$ arrayed along a length of a borehole in an earth formation, each of the plurality of sensors $n^s_j$ generating a gravity measurement $g_j$ at a sensor location $z^s_j$, each of the plurality of sensors separated by a distance h in a direction extending along the length of the borehole;

generating, by a processor in operable communication with the plurality of sensors $n^s_j$, a model of the earth formation that includes approximate geological boundaries $N_m$ having an approximate depth $z^m_k$, the geological boundaries defining a number of geologic layers therebetween;

defining, by the processor, a geological boundary as being represented by a change in density that is at least a minimum density change and defining each of the geologic layers as having a thickness that encompasses two or more of the plurality of sensors $n^s_j$;

determining a density change between adjacent sensors, comparing the density change to the minimum density change, and identifying a geologic boundary z between the adjacent sensors based on the density change being greater than or equal to the minimum density change, and estimating by the processor a location and a density change $\Delta\rho$ of the geologic boundary z between sensor locations $z^s_j$ and $z^s_{j+1}$ based on the gravity measurements $g_j$ received from the plurality of sensors and the distance h, wherein estimating includes estimating the location of the geologic boundary based on the equation:

$$z = z^s_j + \frac{G_j}{G_j + G_{j+1}} h,$$

wherein $G_j$ is a second difference of a sequence of the gravity measurements $g_j$, and is represented by the equation:

$$G_j = (D^2 g)_j = \frac{g_{j+1} - 2g_j + g_{j-1}}{h^2}.$$

2. The method of claim 1, wherein each of the geologic layers has a thickness that encompasses at least three of the plurality of sensors.

3. The method of claim 1, further comprising performing aspects of at least one of a drilling operation and a hydrocarbon production operation at the formation based on the estimated location of the identified geologic boundary.

4. The method of claim 2, wherein estimating includes estimating the density change $\Delta\rho$ based on the equation:

$$\Delta\rho = -\frac{h}{4\pi G}(G_j + G_{j+1}).$$

5. The method of claim 1, wherein estimating includes:
assuming a maximum density variation R between the boundary z and a neighboring boundary, and an expected thickness T of a geologic layer bounded by the boundary z and the neighboring boundary;
determining an expected number of sensors per layer "p", wherein p=[T/h]; and
assuming a maximal distance B between the estimated boundary z and an actual boundary, and determining a natural-valued parameter "s", wherein s=[B/h].

6. The method of claim 1, wherein the gravity measurements $g_j$ are a sequence of gravity measurements that include an error and are represented by:

$$g^e_j = g(z^s_j) + \xi_j,$$

and estimating includes calculating a second difference $G^\epsilon_j$ of the sequence of gravity measurements based on the equation:

$$G^\epsilon_j = \frac{g^\epsilon_{j-1} - 2g^\epsilon_j + g^\epsilon_{j+1}}{h^2}.$$

7. The method of claim 6, wherein estimating includes taking a convolution $C_j$ of the second difference $G^\epsilon_j$ with a regularization sequence $K_j$ represented by the equation:

$$K_j(q) = Q q^{|j|},$$

wherein q is a regularization parameter having a value between zero and one, and Q is represented by the equation:

$$Q = (1-q)/(1+q).$$

8. The method of claim 7, wherein taking the convolution includes deriving the following equations:

$$C_j = \sum_{l=1}^{N_s} K_{j-l}(q) G^\epsilon_j,$$

$j = 1, \ldots, N_s$ (or $C = K(q) * G^\epsilon$);

and $$V_j = \frac{h}{4\pi G(q-1)}(C_j + C_{j+1}), \; j = 1, \ldots, N_s - 1,$$

wherein Vj is an approximation of the boundary density change.

9. The method of claim 8, wherein estimating includes fixing an approximate boundary $n_K$ having a corresponding depth $z_K$, and selecting a value of q that results in a maximum of the absolute value of $V_j$, wherein $V_j$ is represented by the following equation:

$$V_j = \frac{h}{4\pi G(q-1)}(C_j + C_{j+1})$$

$$= \Delta\rho_K \begin{cases} 1, & j = n_K \\ (1-\lambda_K + q\lambda_K)q^{n_K-j-1}, & n_{K-1}+1 \leq j \leq n_K-1 \\ (q(1-\lambda_K)+\lambda_K)q^{j-n_K-1}, & n_K+1 \leq j \leq n_{K+1}-1 \end{cases} ++$$

$$\sum_{k=1}^{K-1} \Delta\rho_k(q(1-\lambda_k)+\lambda_k)q^{j-n_k-1} +$$

$$\sum_{k=K+1}^{N} \Delta\rho_k(1-\lambda_k+q\lambda_k)q^{n_k-j-1} + \frac{h(E_j + E_{j+1})}{4\pi G(q-1)},$$

wherein Ej+Ej+1 is represented by the equation:

$$E_j + E_{j+1} = \sum_{l=1}^{N_s} S^1_{j-l}(q)\xi_l,$$

$$S^1_j(q) = \frac{(1-q)^2}{h^2} \begin{cases} -1, & j = 0, -1 \\ (1-q)q^{j-1}, & j \geq 1 \\ (1-q)q^{-j-2}, & j \leq -2 \end{cases}$$

wherein $\Delta\rho_K$ is the density jump at the boundary $n_K$, $\lambda_K = (z_K - z_j)/h$ for an approximate boundary $n_K$, and the integer value "j" corresponding to the point having the maximum of the absolute value of $V_j$ indicates that the boundary $n_K$ is located between sensors at depths $z^s_j$ and $z^s_{j+1}$.

10. The method of claim 9, further comprising calculating a location of the boundary $n_K$ according to the following equation:

$$\lambda = \Lambda\left(\frac{1+q}{1-q}, \frac{C_{j+1} - C_j}{C_{j+1} + C_j}\right),$$

$$\Lambda(\alpha, t) = \frac{1}{2}(1 + \alpha t + (1-\alpha)t^3).$$

11. A computer program product comprising machine readable instructions stored on machine readable media, the instructions for estimating a property of an earth formation by implementing a method comprising:
receiving gravity measurements from each of a plurality of gravity sensors $n^s_j$ arrayed along a length of a borehole in an earth formation, each of the plurality of sensors $n^s_j$ generating a gravity measurement $g_j$ at a sensor location $z^s_j$, each of the plurality of sensors separated by a distance h in a direction extending along the length of the borehole;
generating, by a processor in operable communication with the plurality of sensors $n^s_j$, a model of the earth formation that includes approximate geological boundaries $N_m$ having an approximate depth $z^m_k$, the geological boundaries defining a number of geologic layers therebetween;
defining, by the processor, a geological boundary as being represented by a change in density that is at least a minimum density change and defining each of the geologic layers as having a thickness that encompasses two or more of the plurality of sensors $n^s_j$;
determining a density change between adjacent sensors, comparing the density change to the minimum density change, and identifying a geologic boundary z between the adjacent sensors based on the density change being greater than or equal to the minimum density change; and
estimating by the processor a location and a density change $\Delta\rho$ the geologic boundary z between sensor locations $z^s_j$ and $z^s_{j+1}$ based on the gravity measurements $g_j$ received from the plurality of sensors $n^s_j$ and the distance h, wherein estimating includes estimating the location of the geologic boundary based on the equation:

$$z = z^s_j + \frac{G_j}{G_j + G_{j+1}} h,$$

wherein $G_j$ is the second difference from a sequence of the gravity measurement $g_j$, and is represented by the equation:

$$G_j = (D^2 g)_j = \frac{g_{j+1} - 2g_j + g_{j-1}}{h^2}.$$

12. The computer program product of claim 1, wherein each of the geologic layers has a thickness that encompasses at least three of the plurality of sensors.

13. The computer program product of claim 11, wherein the method further comprises performing aspects of at least one of a drilling operation and a hydrocarbon production operation at the formation based on the estimated location of the identified geologic boundary.

14. The computer program product of claim 12, wherein estimating includes estimating the density change $\Delta\rho$ based on the equation:

$$\Delta\rho = -\frac{h}{4\pi G}(G_j + G_{j+1}).$$

15. The computer program product of claim 11, wherein estimating includes:
   assuming a maximum density variation R between the boundary z and a neighboring boundary, and an expected thickness T of a geologic layer bounded by the boundary z and the neighboring boundary;
   determining an expected number of sensors per layer "p", wherein p=[T/h]; and
   assuming a maximal distance B between the estimated boundary z and an actual boundary, and determining a natural-valued parameter "s", wherein s=[B/h].

16. The computer program product of claim 11, wherein the gravity measurements $g_j$ are a sequence of gravity measurements that include an error $\xi_j$, and are represented by:

$$g^\epsilon_j = g(z^s_j) + \xi_j,$$

and estimating includes calculating a second difference $G^\epsilon_j$ of the sequence of gravity measurements based on the equation:

$$G^\epsilon_j = \frac{g^\epsilon_{j-1} - 2g^\epsilon_j + g^\epsilon_{j+1}}{h^2}.$$

17. The computer program product of claim 16, wherein estimating includes taking a convolution $C_j$ of the second difference $G^\epsilon_j$ with a regularization sequence $K_j$ represented by the equation:

$$K_j(q) = Qq^{|j|},$$

wherein q is a regularization parameter having a value between zero and one, and Q is represented by the equation:

$$Q = (1-q)/(1+q).$$

18. The computer program product of claim 17, wherein taking the convolution includes deriving the following equations:

$$C_j = \sum_{l=1}^{N_s} K_{j-l}(q) G^\epsilon_j,$$

$$j = 1, \ldots, N_s \text{ (or } C = K(q) * G^\epsilon);$$

and $$V_j = \frac{h}{4\pi G(q-1)}(C_j + C_{j+1}), j = 1, \ldots, N_s - 1,$$

wherein Vj is an approximation of the boundary density change.

19. The computer program product of claim 18, wherein estimating includes fixing an approximate boundary $n_K$ having a corresponding depth $z_K$, and selecting a value of q that results in a maximum of the absolute value of $V_j$, wherein $V_j$ is represented by the following equation:

$$V_j = \frac{h}{4\pi G(q-1)}(C_j + C_{j+1})$$

$$= \Delta\rho_K \begin{Bmatrix} 1, & j = n_K \\ (1 - \lambda_K + q\lambda_K)q^{n_K - j - 1}, & n_{K-1} + 1 \leq j \leq n_K - 1 \\ (q(1-\lambda_K) + \lambda_K)q^{j-n_K-1}, & n_K + 1 \leq j \leq n_{K+1} - 1 \end{Bmatrix} ++$$

$$\sum_{k=1}^{K-1} \Delta\rho_k(q(1-\lambda_k) + \lambda_k)q^{j-n_k-1} +$$

$$\sum_{k=K+1}^{N} \Delta\rho_k(1 - \lambda_k + q\lambda_k)q^{n_k - j - 1} + \frac{h(E_j + E_{j+1})}{4\pi G(q-1)},$$

wherein Ej+Ej+1 is represented by the equation:

$$E_j + E_{j+1} = \sum_{l=1}^{N_s} S^1_{j-l}(q)\xi_l,$$

$$S^1_j(q) = \frac{(1-q)^2}{h^2} \begin{cases} -1, & j = 0, -1, \\ (1-q)q^{j-1}, & j \geq 1, \\ (1-q)q^{-j-2}, & j \leq -2. \end{cases}$$

wherein $\Delta\rho_K$ is the density jump at the boundary $n_K$, $\lambda_K = (z_K - z_j)/h$ for an approximate boundary $n_K$, and the integer value "j" corresponding to the point having the maximum of the absolute value of $V_j$ indicates that the boundary $n_K$ is located between sensors at depths $z^s_j$ and $z^s_{j+1}$.

20. The computer program product of claim 19, further comprising calculating a location of the boundary $n_K$ according to the following equation:

$$\lambda = \Lambda\left(\frac{1+q}{1-q}, \frac{C_{j+1} - C_j}{C_{j+1} + C_j}\right),$$

$$\Lambda(\alpha, t) = \frac{1}{2}(1 + \alpha t + (1-\alpha)t^3).$$

* * * * *